(12) United States Patent
Bayles

(10) Patent No.: US 8,719,355 B2
(45) Date of Patent: May 6, 2014

(54) PLATFORM INDEPENDENT IDN E-MAIL STORAGE TRANSLATION

(75) Inventor: Len Albert Bayles, Sandy, UT (US)

(73) Assignee: Afilias Limited (IE)

(*) Notice: Subject to any disclaimer, the term of this patent is extended or adjusted under 35 U.S.C. 154(b) by 393 days.

(21) Appl. No.: 12/921,754

(22) PCT Filed: Mar. 10, 2009

(86) PCT No.: PCT/CA2009/000287
§ 371 (c)(1),
(2), (4) Date: Oct. 1, 2010

(87) PCT Pub. No.: WO2009/111869
PCT Pub. Date: Sep. 17, 2009

(65) Prior Publication Data
US 2011/0022675 A1    Jan. 27, 2011

Related U.S. Application Data

(60) Provisional application No. 61/035,357, filed on Mar. 10, 2008.

(51) Int. Cl.
*G06F 15/16* (2006.01)

(52) U.S. Cl.
USPC ........... 709/206; 709/217; 709/219; 709/226; 709/245

(58) Field of Classification Search
CPC ..... H04L 51/28; H04L 51/066; H04L 61/307; H04L 12/5835; H04L 29/12594
USPC .......................... 709/206, 217, 219, 226, 245
See application file for complete search history.

(56) References Cited

U.S. PATENT DOCUMENTS

| | | | | |
|---|---|---|---|---|
| 7,058,417 | B2* | 6/2006 | Jeong | 455/466 |
| 2001/0043594 | A1* | 11/2001 | Ogawa et al. | 370/356 |
| 2002/0120689 | A1* | 8/2002 | Kang et al. | 709/206 |
| 2003/0163691 | A1* | 8/2003 | Johnson | 713/168 |
| 2003/0208547 | A1* | 11/2003 | Branimir | 709/206 |
| 2005/0251500 | A1* | 11/2005 | Vahalia et al. | 707/1 |
| 2007/0100999 | A1* | 5/2007 | Haider | 709/225 |

FOREIGN PATENT DOCUMENTS

| | | |
|---|---|---|
| WO | 99/19814 | 4/1999 |
| WO | 00/13081 | 3/2000 |
| WO | 00/50966 | 8/2000 |
| WO | 01/39457 A2 | 5/2001 |
| WO | 0159605 A1 | 8/2001 |

OTHER PUBLICATIONS

EPO, EPO Appln No. 09719909.5, Extended European Search Report, Sep. 14, 2011, 8 pages.

(Continued)

*Primary Examiner* — Liangche A Wang
(74) *Attorney, Agent, or Firm* — Marger Johnson & McCollom, PC

(57) ABSTRACT

A method is described for providing platform independent e-mail translation. The method comprising the following steps. An e-mail message is received for a recipient IDN username. An ASCII identifier corresponding with the IDN username is retrieved using a predefined mapping. The received e-mail message is stored in local storage using the retrieved ASCII identifier. An e-mail server configured to implement the method and a computer readable medium comprising instructions for implementing the method are also described.

15 Claims, 3 Drawing Sheets

(56) References Cited

OTHER PUBLICATIONS

Paul Hoffman Internet Mail Consortium: "SMTP Service Extensions or Transmission of Headers in UTF-8 Encoding; draft-hoffman-utf8headers--00.txt," IETF Standard-Working Draft, Internet Engineering Task Force, IETF, CH, Dec. 15, 2003, XP015014452, ISSN:000-0004.

Klensin, J. and Ko, Y.: "Overview and Framework for Internationalized E-mail; rfc4952.txt," IETF Standard, Internet Engineering Task Force, IETF, CH, Jul. 1, 2007, XPO15052488, ISSN: 0000-0003.

* cited by examiner

PLATFORM INDEPENDENT IDN E-MAIL STORAGE TRANSLATION

The present invention relates generally to electronic mail (e-mail) servers and specifically to electronic mail servers configured to handle internationalized domain names (IDNs).

BACKGROUND

With the growth of computer networks, electronic mail (e-mail) has become a popular means for both personal and professional communication. Due, in large part, to the proliferation of the Internet, e-mail has become a standard means of communication for millions of people.

A sender uses a Mail User Agent (MUA) to create an e-mail message. Examples of MUAs include client-side applications such as Microsoft Outlook and Eudora as well as web-based applications such as Hotmail and Gmail. As is well known, the sender creates the e-mail message by entering one or more e-mail addresses, a message subject, a message body and may also attach files to the message. Each e-mail address comprises two portions. A first portion is referred to as a domain of the e-mail address and references a host name or domain name. The domain is typically located to the right of the '@' sign. A second portion is referred to as a username or account name and is used to identify an e-mail account at the domain. The username is typically located to the left of the '@' sign.

The MUA transmits the e-mail message to the recipient, or recipients, via a transmission e-mail server. The transmission e-mail server includes a Mail Submission Agent (MSA) and a Simple Mail Transfer Protocol (SMTP) server. The MSA contacts a Domain Name Server (DNS) to resolve the domain name of the e-mail address and obtain a corresponding Internet Protocol (IP) address. The SMTP server uses the obtained IP address to transmit the message to a receiving e-mail server for the recipient.

The receiving e-mail server typically includes a Mail Transport Agent (MTA), a local delivery agent, local file storage, and a Post Office Protocol (POP) and/or Internet Message Access Protocol (IMAP) server to allow e-mail message retrieval. The recipient uses a MUA to retrieve the e-mail message from the receiving e-mail server.

In a typical ASCII environment all of the services provided by the receiving e-mail server communicate with a local password file for local username information. The local password file is used for account recognition and authentication.

However, e-mail addresses in the future will potentially contain foreign language (non-ASCII) characters. For example, Internationalized Domain Names (IDNs) are defined as Internet domain names that can potentially include non-ASCII characters. It is envisaged that international e-mail addresses may also include IDN usernames as part of such an e-mail address. Therefore, it is possible that the IDN usernames may also include non-ASCII characters.

These characters are not typically supported by the operating systems on computer servers for usernames, file names, and directory names. In an non-ASCII environment, password files cannot be used due to lack of Unicode character support. In addition most file systems restrict file and directory names to a seven bit ASCII character.

Accordingly, it will be appreciated that there is a need to provide MTAs capable of supporting non-ASCII e-mail usernames.

SUMMARY

The following describes an e-mail server that is capable of seamlessly converting e-mail usernames from natively displayed non-ASCII characters to ASCII characters that will functionally support usernames, file names, and directory names, thereby overcoming the problems associated with the lack of Unicode support.

In accordance with an aspect of the present invention there is provided an e-mail server comprising: a mail transport agent (MTA) configured to receive an e-mail message for an IDN username; a local delivery agent configured to store the received e-mail message in local storage; and a translation table configured to maintain a mapping between the IDN username and a corresponding ASCII identifier, the translation table in communication with at least one of the MTA or the local delivery agent; wherein the local delivery agent stores the received e-mail message in the local storage in accordance with the ASCII identifier.

In accordance with a further aspect of the present invention there is provided a method for providing platform independent e-mail translation, the method comprising the steps of: receiving an e-mail message for a recipient IDN username; retrieving an ASCII identifier corresponding with the IDN username using a predefined mapping; and storing the received e-mail message in local storage using the retrieved ASCII identifier.

In accordance with yet a further aspect of the present invention, there is provide a computer readable medium comprising instructions for implement the method above.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
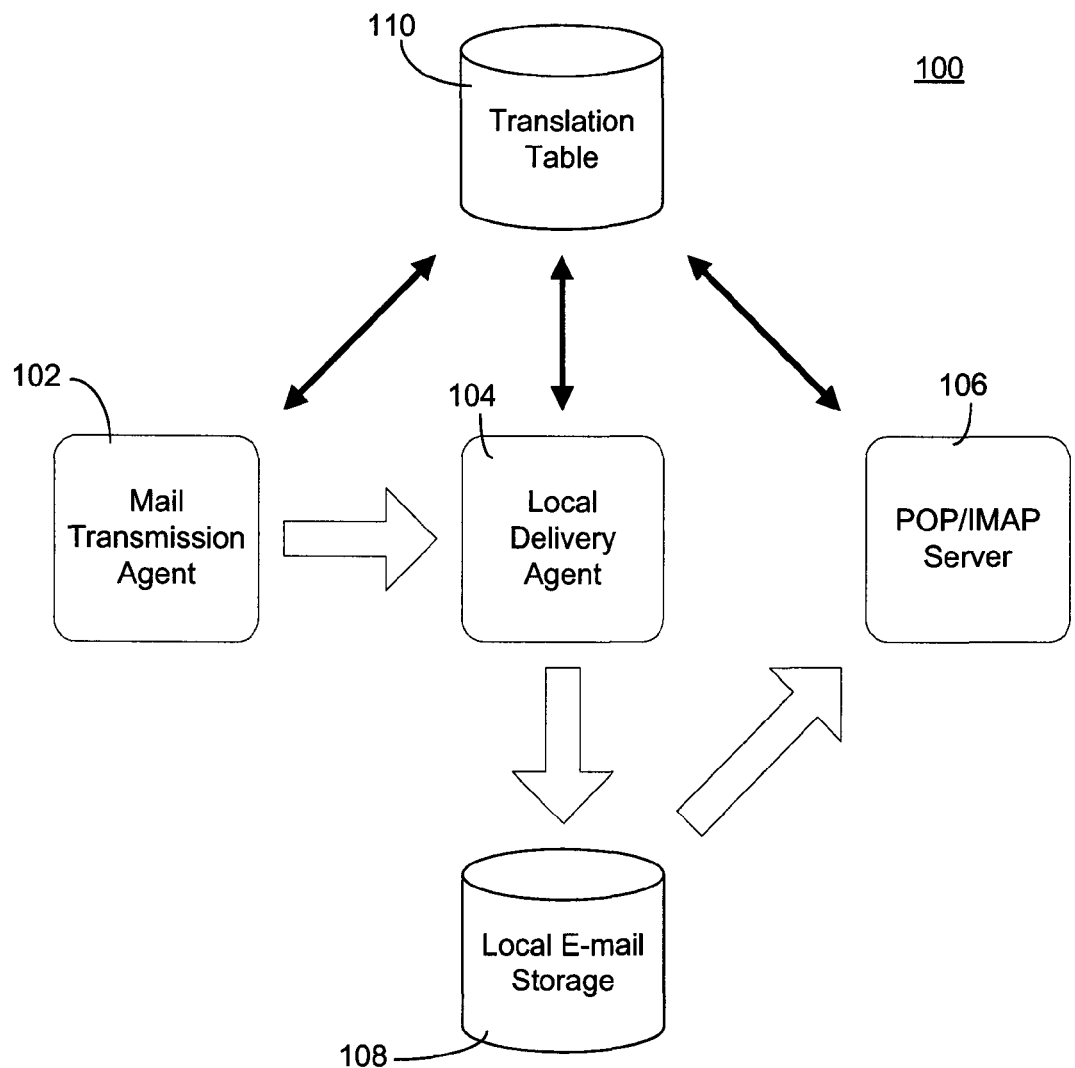
FIG. 1 is a block diagram illustrating an e-mail server.

For convenience, numerals in the drawing refer to like numerals in the description. Referring to FIG. 1, a receiving e-mail server in accordance with an embodiment of the present invention is illustrated generally by numeral 100. For ease of explanation, the receiving e-mail server will simply be referred to as the e-mail server. The e-mail server 100 includes a Mail Transfer Agent (MTA) 102, a local delivery agent 104, a message retrieval server 106, local storage 108 and a translation table 110.

The MTA 102 is configured to receive a request from a requestor to receive an e-mail message. The MTA 102 is further configured to determine the existence of an intended recipient against the translation table 110 and notify the requestor of either a success or a failure.

The local delivery agent 104 is configured to persist the received e-mail message on the local storage 108 in a directory corresponding with the username. The local delivery agent 104 may also be configured to determine the existence of an intended recipient against the translation table 110, depending upon the implementation.

The message retrieval server 106 comprises one or more of a POP server, an IMAP server or a local host server, and is configured to deliver e-mail messages from the local storage 108 to a recipient. The message retrieval server is also configured to communicate with the translation table 110.

The translation table 110 is a table and/or database that is configured to translate an IDN username into a corresponding ASCII identifier compatible with an operating system of the e-mail server 102. Furthermore the translation table 110 is configured to maintain and manage the translated names accordingly.

One of several methods can be employed to translate the IDN username into an ASCII identifier.

For example, in one embodiment, the translation table 110 correlates the IDN username with an ASCII identifier comprising a random ASCII string. That is, each new IDN username added to the translation table 110 is mapped to an ASCII identifier comprising a string of random, acceptable ASCII characters and the mapping is stored in the table/database. In order to avoid collisions, each IDN username is mapped to a unique random ASCII string. In order to ensure that each random string is unique, each time a random ASCII string is generated it is compared against previously generated random ASCII strings. If the random string previously exists it is discarded and a new random ASCII string is generated.

In the present embodiment, each random ASCII string is generated as needed. That is, when a new IDN username is added to the e-mail server 100. Alternatively, a predefined number of unique random ASCII strings can be generated a priori. Accordingly, when a new IDN username is added to the e-mail server 100, an existing random ASCII is assigned by the translation table 110.

In another embodiment, the translation table 110 correlates the IDN username with an ASCII identifier comprising a sequential ASCII string. In this embodiment, each new IDN username added to the translation table 110 is mapped to an ASCII identifier comprising a string of acceptable ASCII characters. However, in contrast to the previous embodiment, each ASCII identifier is generated in sequence. Accordingly, in the present embodiment it is not necessary to check a generated ASCII identifier against previously generated ASCII identifiers since each ASCII identifier will be unique until the sequence is exhausted.

In yet another embodiment, the translation table 110 correlates the IDN username with an ASCII identifier comprising an extrapolated ASCII string. That is, the ASCII string is generated from the IDN username using a predefined algorithm. For example, a ToASCII algorithm, which uses a Punycode encoder, is well known for converting non-ASCII strings to ASCII strings.

The ToASCII algorithm leaves an ASCII string unchanged, but changes a string containing at least one non-ASCII character. In order to accomplish this, the ToASCII algorithm applies a NamePrep algorithm, which converts the string to lowercase and performs other normalization. The ToASCII algorithm then translates the result to ASCII using a Punycode encoder. A 4-character string "xn-" is prefixed to the resulting ASCII string. This 4-character string is called the ASCII Compatible Encoding (ACE) prefix and is used to distinguish Punycode-encoded strings from ordinary ASCII strings.

Although only a few methods for correlating an IDN username with an ASCII are described herein, other method as will be appreciated by a person of ordinary skill in the art. Whichever method is used the resulting IDN username and corresponding ASCII identifier are maintained in the table/database of the translation table 110 where a lookup can be performed as necessary.

Figure 2:
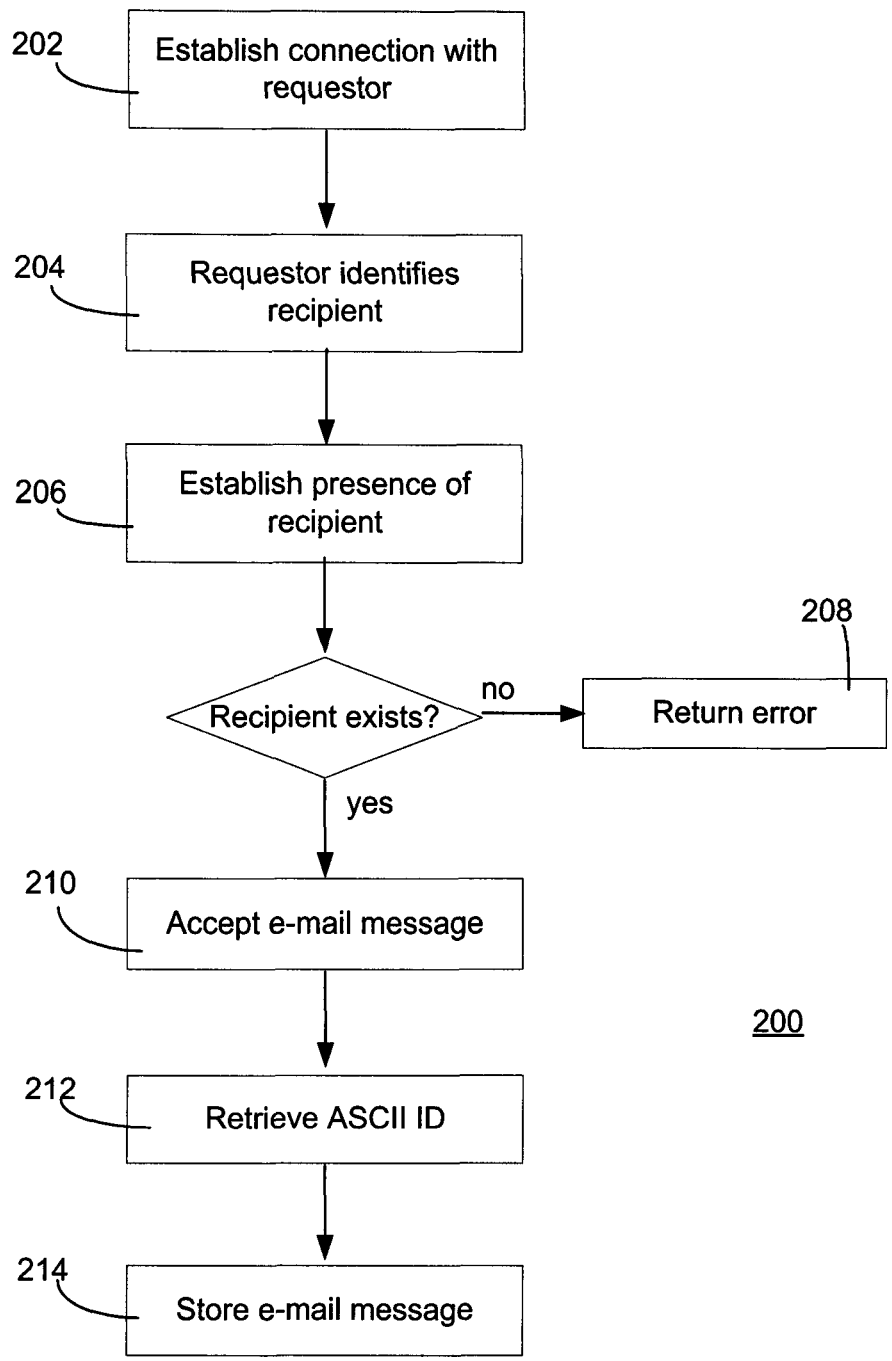
FIG. 2 is a flow chart illustrating receiving an e-mail message at the e-mail server.

Referring to FIG. 2, a flow chart for receiving an e-mail message at the e-mail server 100 is illustrated generally by numeral 200. At step 202 the MTA 102 establishes a connection with a requestor, which is often, although not necessarily, a transmitting e-mail server (not shown). At step 204, the requestor informs the MTA 102 of the intended recipient. At step 206, the MTA 102, either by itself or via the local delivery agent 104, establishes the existence of the intended recipient against the translation table 110.

If it is determined that the intended recipient is not located in the translation table 110, the method continues at step 208 and the requestor, and thereby the sender, is notified of the failure. If it is determined that the intended recipient is located in the translation table 110, the method continues at step 210 and the e-mail message is accepted from the sender.

At step 212, the local delivery agent 104 retrieves the ASCII identifier for the corresponding IDN username from the IDN translation table. At step 214, the local delivery agent 104 writes the e-mail message to the file storage 108 in accordance with the retrieved ASCII identifier.

The present embodiment describes a discrete step 212 for the local delivery agent 104 to retrieve the ASCII identifier. Alternatively, either the local delivery agent 104 or the MTA 102 retrieves the ASCII identifier when the IDN username is verified at step 206.

Figure 3:
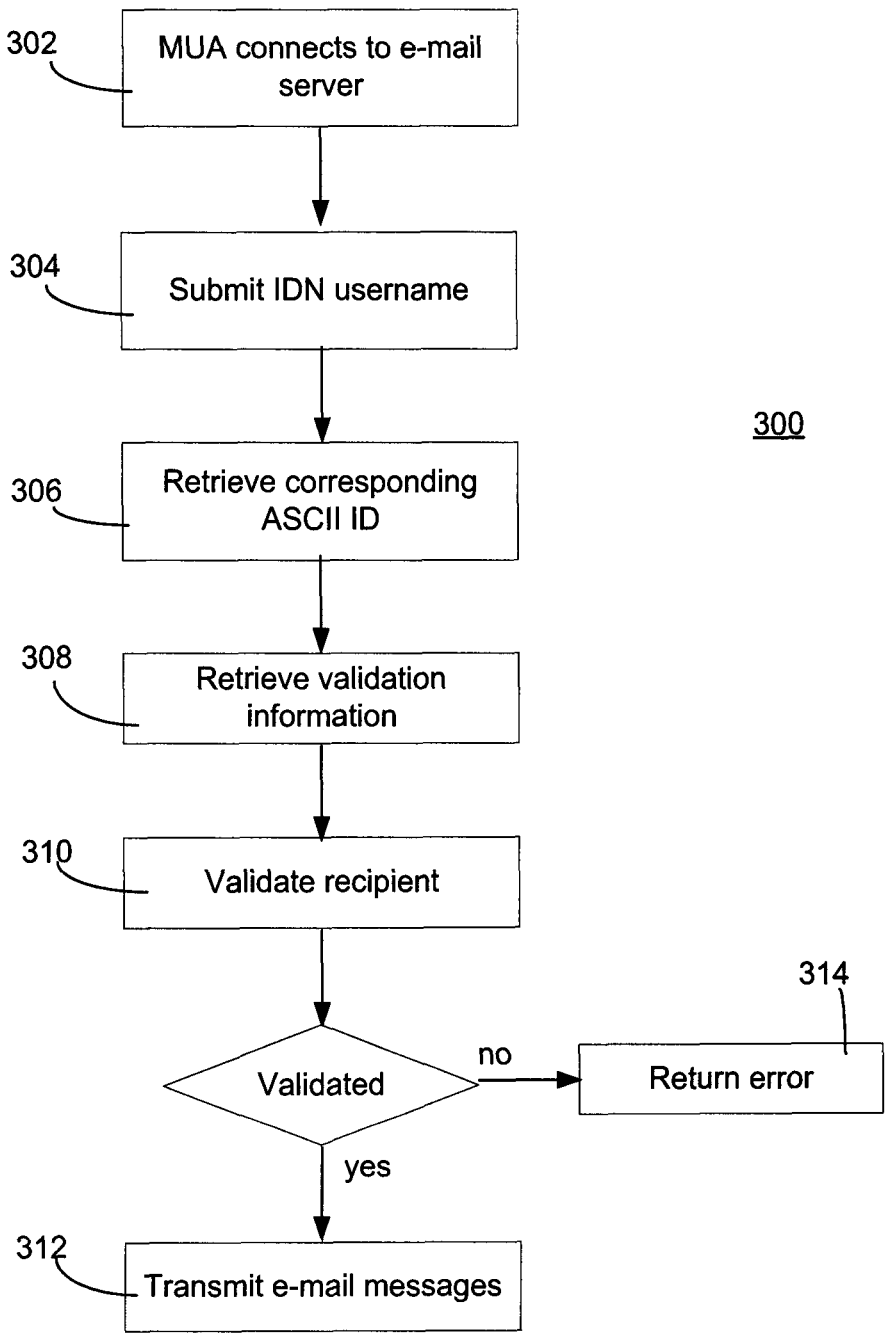
FIG. 3 is a flow chart illustrating retrieving an e-mail message from the e-mail server.

Referring to FIG. 3, a flow chart for retrieving an e-mail message from the e-mail server 100 is illustrated generally by numeral 300. At step 302 the recipient's Mail User Agent (MUA) connects to the e-mail server 100 via the message retrieval server 106 using POP, IMAP, or another locally hosted method. In step 304, the MUA submits the recipient's IDN username and corresponding password for authentication.

At step 306, message retrieval server 106 translates the IDN username to its ASCII identifier via the translation table 110. At step 308, ASCII identifier is used to locate the recipient's validation information on the file storage 108. At step 310, the validation information is used to validate the password against a previously stored copy, typically in encrypted form.

If the authentication is successful, then at step 312 the recipient's e-mail messages are transferred to the recipient for reading. If the authentication is unsuccessful, then at step 314 the MUA is notified of an error.

Accordingly, it will be appreciated that the present invention provides an intermediate ASCII version of a non-ASCII e-mail username in order to facilitate traditional e-mail server functionality with existing operating systems, independent of the platform used to implement the e-mail server. Furthermore, traditional functionality is provided while remaining transparent to both the sender and the recipient Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the spirit of the invention or the scope of the appended claims.

The invention claimed is:

1. An e-mail server operating in an Internationalized Domain Name (IDN) environment, the e-mail server comprising:
    a mail transport agent (MTA) configured to receive an e-mail message for an Internationalized Domain Name username;
    a local delivery agent configured to store the received e-mail message in local storage; and
    a translation table configured to maintain a mapping from the IDN username to a corresponding ASCII identifier, the mapping from the IDN username to the ASCII identifier generated upon adding the IDN username to the e-mail server, the ASCII identifier compatible with an ASCII environment e-mail server, the translation table in communication with at least one of the MTA and the local delivery agent;
    wherein the local delivery agent stores the received e-mail message in the local storage in accordance with the ASCII identifier.

2. The e-mail server of claim 1, wherein the translation table is further configured to generate the mapping between the IDN username and the corresponding ASCII identifier.

3. The e-mail server of claim 2, wherein the ASCII identifier is a random ASCII string such that for each of a plurality of IDN usernames a random ASCII string is generated.

4. The e-mail server of claim 3, wherein each ASCII identifier is compared with previously generated ASCII identifier to avoid collisions.

5. The e-mail server of claim 2, wherein the ASCII identifier is a sequential ASCII string such that for each of a plurality of IDN usernames a subsequent ASCII string in a sequence of ASCII strings is generated.

6. The e-mail server of claim 1 further comprising a message retrieval server for delivering e-mail messages from the e-mail server to a recipient, the message retrieval server configured to:
    receive the IDN username associated with a request to retrieve the e-mail message;
    communicate with the translation table in order to obtain the ASCII identifier mapped to the received IDN username; and
    retrieve the e-mail message associated with the obtained ASCII identifier.

7. The e-mail server of claim 6, wherein the message retrieval server is further configured to validate the recipient by using the obtained ASCII identifier to access validation information in the local storage.

8. A method for providing platform independent e-mail translation at an e-mail server operating in an Internationalized Domain Name (IDN) environment, the method comprising the steps of:
    receiving an e-mail message for a recipient Internationalized Domain Name username;
    retrieving an ASCII identifier corresponding with the IDN username using a predefined mapping table that maintains a mapping from the IDN username to the ASCII identifier, the mapping from the IDN username to the ASCII identifier generated upon adding the IDN username to the e-mail server, the ASCII identifier compatible with an ASCII environment e-mail server;
    storing the received e-mail message in local storage using the retrieved ASCII identifier.

9. The method of claim 8, comprising the further step of generating the mapping between the IDN username and the corresponding ASCII identifier.

10. The method of claim 9, wherein the ASCII identifier is a random ASCII string such that for each of a plurality of IDN usernames a random ASCII string is generated.

11. The method of claim 10, wherein each ASCII identifier is compared with previously generated ASCII identifier to avoid collisions.

12. The method of claim 9, wherein the ASCII identifier is a sequential ASCII string such that for each of a plurality of IDN usernames a subsequent ASCII string in a sequence of ASCII strings is generated.

13. The method of claim 8 comprising the further steps of:
    receiving a request to deliver e-mail message from the e-mail server to a recipient IDN username, the request including the recipient's IDN username;
    obtaining the ASCII identifier mapped to the recipient's IDN username from the predefined mapping table; and
    retrieving e-mail message from local storage associated with the obtained ASCII identifier for transmission to the recipient IDN username.

14. The method of claim 13, comprising the further step of validating the recipient using the obtained ASCII identifier to access validation information in the local storage.

15. A non-transitory computer-readable storage medium comprising instructions for providing platform independent e-mail translation at an e-mail server operating in an Internationalized Domain Name (IDN) environment, the instructions, when executed by a computing device, cause the computing device to implement the steps of:
    receiving an e-mail message for an Internationalized Domain Name username;
    retrieving an ASCII identifier corresponding with the IDN username using a predefined mapping table that maintains a mapping from the IDN username to the ASCII identifier, the mapping from the IDN username to the ASCII identifier generated upon adding the IDN username to the e-mail server, the ASCII identifier compatible with an an ASCII environment e-mail server functionality; and
    storing the received e-mail message in local storage using the retrieved ASCII identifier.

* * * * *